June 15, 1926.
J. A. TOOMEY
1,589,267
TRANSMISSION MECHANISM
Filed July 14, 1924 5 Sheets-Sheet 1
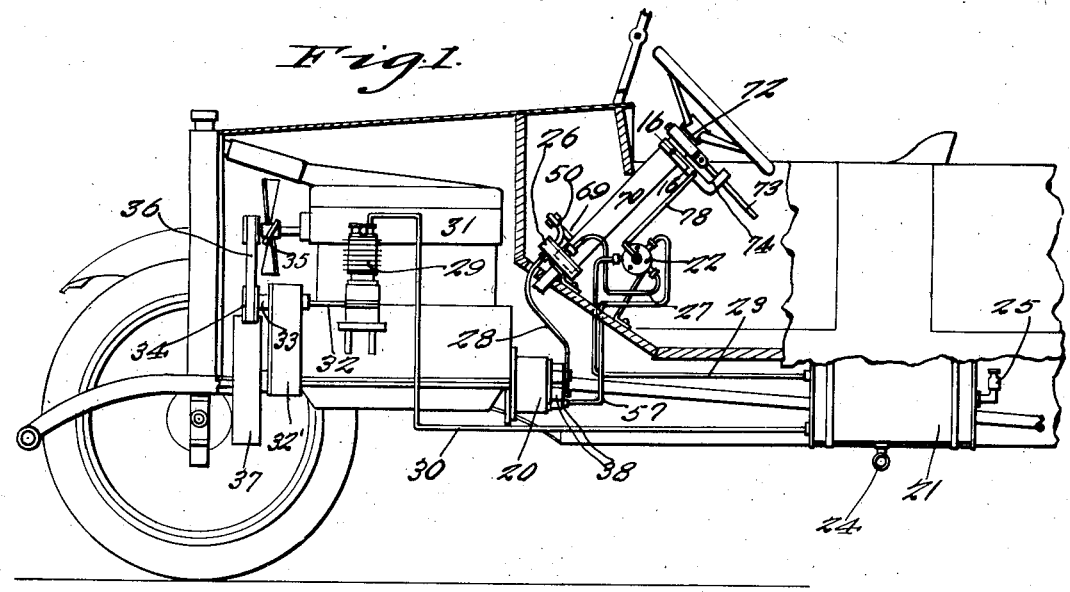

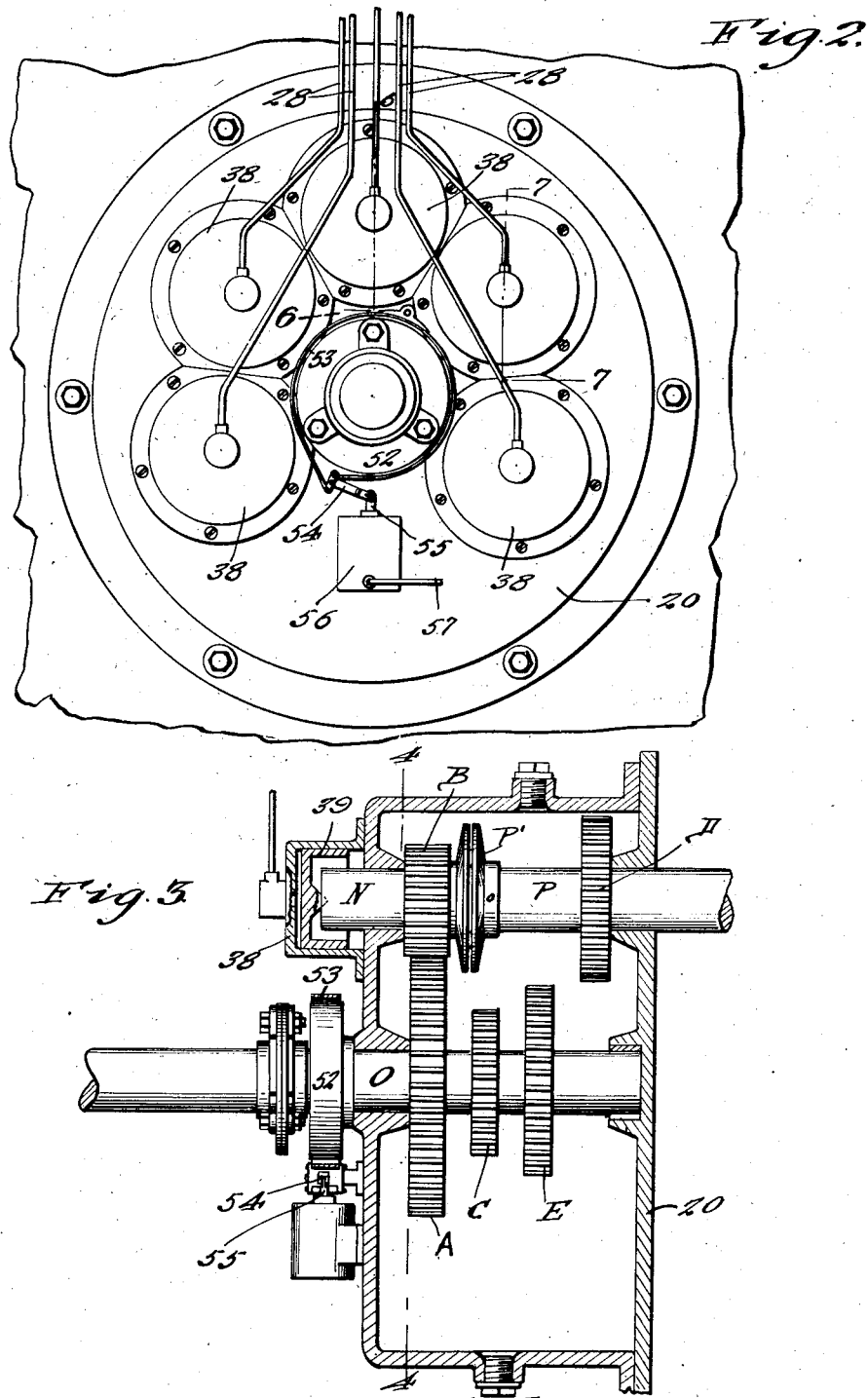

June 15, 1926. 1,589,267
J. A. TOOMEY
TRANSMISSION MECHANISM
Filed July 14, 1924 5 Sheets-Sheet 3

J. A. Toomey INVENTOR
BY Victor J. Evans
ATTORNEY

WITNESS:

June 15, 1926.
J. A. TOOMEY
1,589,267
TRANSMISSION MECHANISM
Filed July 14, 1924    5 Sheets-Sheet 4
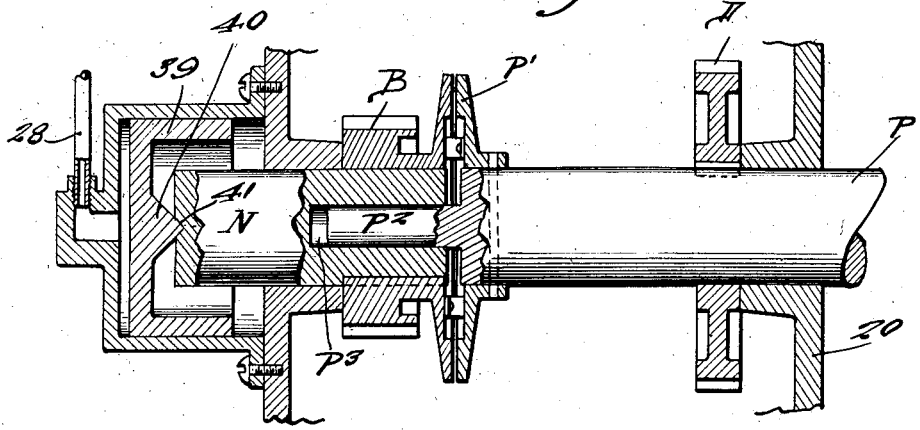
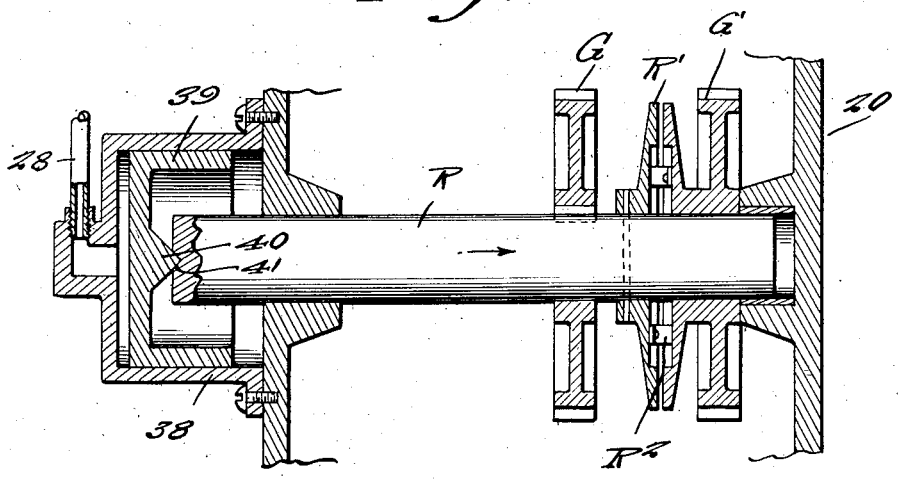
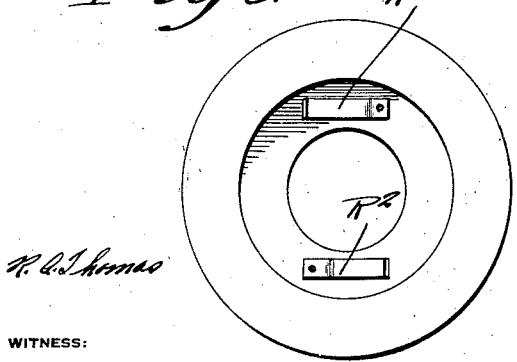
J. A. Toomey INVENTOR June 15, 1926.
J. A. TOOMEY
TRANSMISSION MECHANISM
Filed July 14, 1924     5 Sheets-Sheet 5
1,589,267
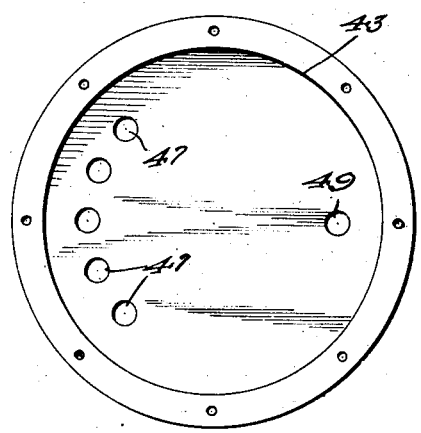
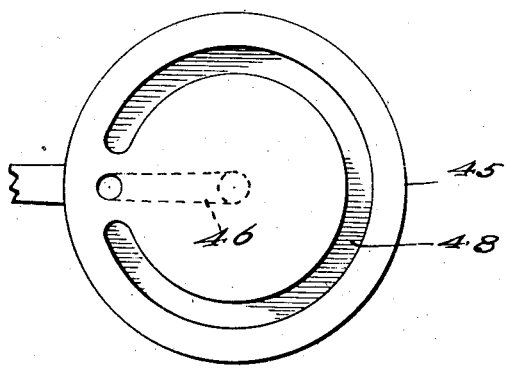
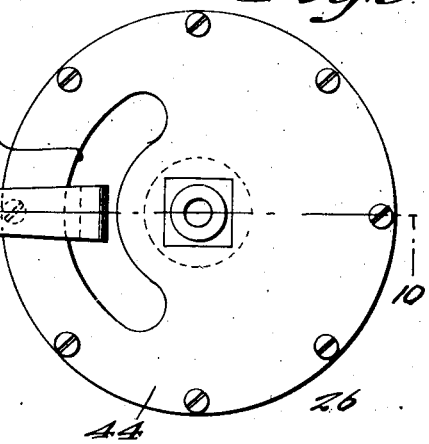
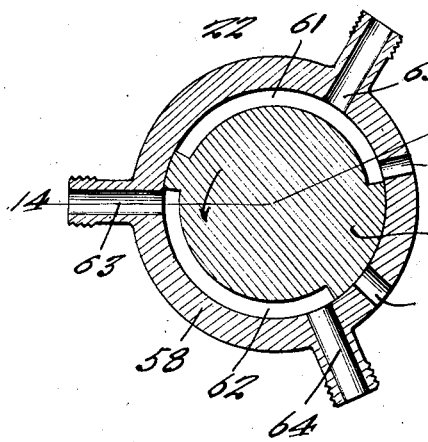
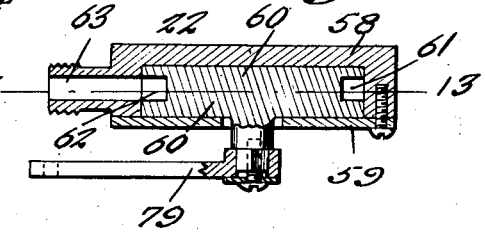
J. A. Toomey INVENTOR
BY Victor J. Evans ATTORNEY
WITNESS:

Patented June 15, 1926.

1,589,267

UNITED STATES PATENT OFFICE.

JOHN A. TOOMEY, OF LOS ANGELES, CALIFORNIA.

TRANSMISSION MECHANISM.

Application filed July 14, 1924. Serial No. 725,951.

This invention relates to power transmission mechanisms especially adapted for use in motor operated vehicles, an object of the invention being to provide a mechanism of this character in which the gears which serve to connect the drive shaft with the driven shaft are continuously engaged so as to eliminate the necessity of disengaging and engaging gears in changing the speed of the driving mechanism of an automobile.

Another object of the invention is the provision of means of this character in which the speed controlling means is pneumatically operated, provision being made for selectively operating the speed changing gears so that change of speed may be smoothly and readily effected.

Another object of the invention is the provision of a power transmission mechanism for automobiles by means of which the usual clutch is dispensed with.

Another object of the invention is the provision of pneumatically operated means for controlling the speed change gearing of an automobile and for controlling the brake mechanism, together with means for conveniently operating either the transmission mechanism or the brake mechanism.

With the above and other objects in view, the invention further includes the following novel features and details of construction, to be hereinafter more fully described, illustrated in the accompanying drawings and pointed out in the appended claims.

In the drawings:—

Figure 1 is a fragmentary side elevation partly in section showing an automobile equipped with the invention.

Figure 2 is an enlarged elevation of the inner end of the transmission housing.

Figure 3 is a sectional view on the line 3—3 of Figure 4.

Figure 4:
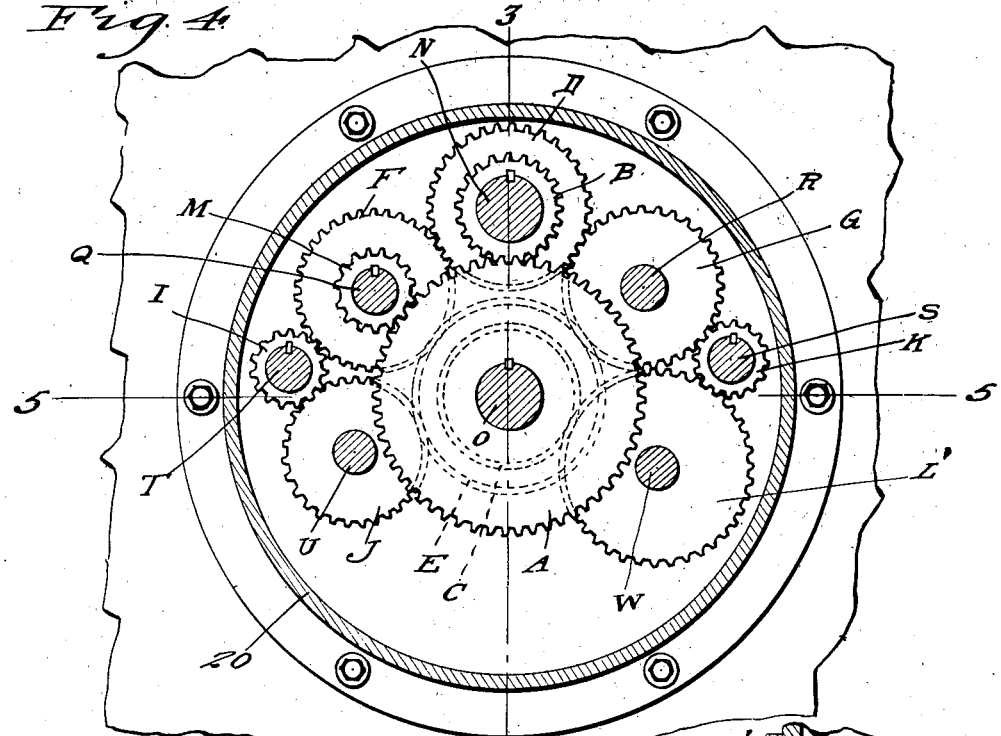
Figure 4 is a sectional view on the line 4—4 of Figure 3.
Figure 5:
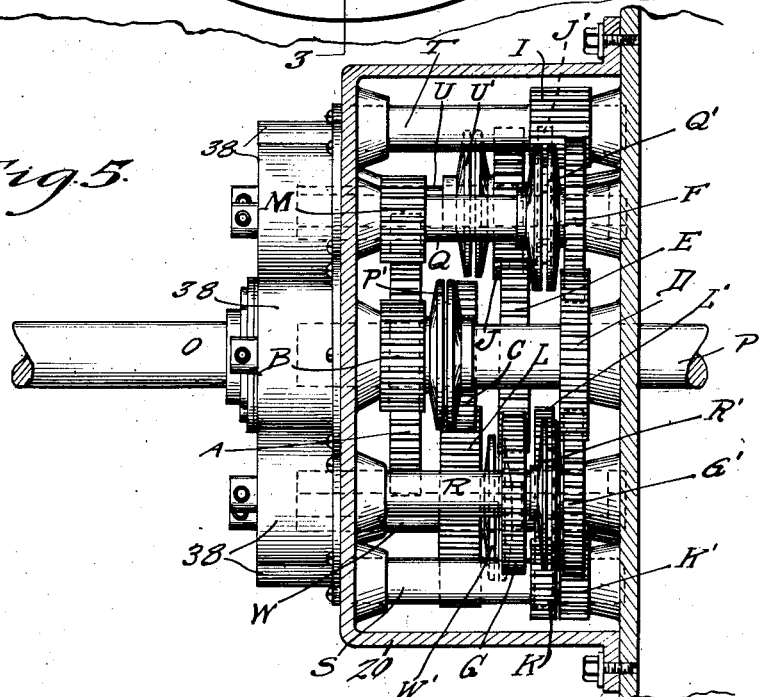

Figure 5 is a sectional view on the line 5—5 of Figure 4.

Figure 6 is an enlarged section taken substantially on the line 6—6 of Figure 2.

Figure 7 is a similar view taken substantially on the line 7—7 of Figure 2.

Figure 8 is an elevation showing the inner position of one of the clutch members.

Figure 9 is an enlarged plan view of the cylinder valve for controlling the transmission mechanism.

Figure 10 is a section on the line 10—10 of Figure 9.

Figure 11 is an inner face view of the stationary member of the cylinder valve.

Figure 12 is a similar view of the rotor.

Figure 13 is a sectional view of the main controlling valve, the section being taken substantially on the line 13—13 of Figure 14.

Figure 14 is a sectional view on the line 14—14 of Figure 13.

Figure 15 is a fragmentary plan view illustrating the controlling device and its connection with the cylinder valve.

Figure 16 is an enlarged sectional view on the line 16—16 of Figure 1, the figure also showing the cylinder valve in plan view.

Figure 17 is a section taken substantially on the line 17—17 of Figure 15.

Referring in detail to the drawings wherein like characters of reference denote corresponding parts, the transmission mechanism is contained within a housing which is indicated generally at 20 and as this mechanism is pneumatically controlled there is provided a compressed air tank 21 and a main controlling valve 22 which is connected to the tank 21 by a pipe 23. The tank 21 is provided with a connection 24 for the introduction of compressed air from a service station, while a safety valve 25 is provided for preventing excess pressure within the tank. The invention further includes a selector or cylinder valve 26 to which air is supplied from the main valve 22 through a pipe 27, while pipes 28 serve to establish communication between the various ports of the valve 26 and the transmission mechanism as will be hereinafter apparent.

It is preferred that air be supplied to the tank 21 from an air compressor 29 through a pipe 30, and the air compressor may be operated by the engine 31 of the automobile through any suitable means. This means may consist of a shaft 32 which is driven from the crank shaft of the engine 31 by a chain or other suitable power transmitting means contained within a housing 32'. A shaft 33 may carry a pulley 34 which serves to drive the engine fan 35 by means of a belt 36. The fly wheel of the engine is indicated at 37.

*Transmission mechanism.*

The transmission mechanism is located within the housing 20 which is suitably secured in place and into which extends the crank shaft P of the engine, the said shaft forming the drive shaft of the transmission mechanism. The shaft P is of sectional formation and includes a section N which is movable longitudinally with respect to the main portion P of the shaft and for this purpose the shaft P is provided with a reduced extension P² which is slidable and rotatable within a socket P³ provided in the section N. Fast upon the shaft P is a gear D which engages and drives a gear F and a gear G', both of which are free to rotate on their respective shafts Q and R. The shaft Q is the low speed shaft while the shaft R may be considered the ordinary high speed shaft.

The shaft R has secured thereto one member of a clutch R', the other member of which is secured to the gear G'. This shaft R is mounted for longitudinal sliding movement and is illustrated in detail in Figure 7 of the drawings, the members of the clutch R' being normally forced apart by oppositely located springs R² as illustrated in detail in Figure 8 of the drawings. The gear G' is thus normally free upon the shaft but when the latter is moved in the direction of the arrow as shown in Figure 7, the gear G' will be locked to the shaft. The means by which the shaft is moved will be later apparent. Secured upon the shaft R is a gear G and this gear engages a gear E which is fast on the shaft O, this last mentioned shaft forming the drive shaft of the automobile and the driven shaft of the transmission mechanism. The shaft Q has secured thereon a pinion M which engages a gear A fast on the shaft O and this last mentioned shaft has secured thereon a gear C which is engaged by a gear L which is loose on the shaft W and which is adapted to be secured upon the shaft by a clutch W'. The shaft W is designed to provide a special speed which may be higher than the speed of the ordinary high speed shaft. This shaft W is slidable after the manner of the shaft R and the shaft Q and the gear F of the last mentioned shaft is adapted to be secured to said shaft by a clutch Q' similar to the clutch R'.

The gear E is also engaged by a gear J which is loose on the shaft U and which is adapted to be connected to said shaft by a clutch U'. This shaft U is the intermediate or second speed shaft and has secured thereon a gear J' which is engaged by a pinion I which is fast on a shaft T. The gear L' on the shaft W is engaged by a pinion K which is fast on a shaft S and this shaft also has secured thereon a pinion K' which is engaged by the gear G'.

Fast upon the slidable section of the shaft N is a pinion B to which is secured one member of the clutch P' and this pinion engages the gear A.

As thus far described the mechanism includes a pinion B which is fast on the movable section of the shaft N and which carries one member of the clutch P' which serves to connect the section N to the main section of the shaft P. The mechanism further includes gears E, C and A which are fast on the shaft O; gear D which is fast on shaft P; gear F which is loose on shaft Q and a gear M which is fast on shaft Q. Gear G' rotates loosely on the shaft R, while gear G is fast on shaft R. The gear F is adapted to be connected to the shaft Q by the clutch Q' and the gear G' is adapted to be connected to the shaft R by the clutch R'. Pinions K and K' are fast on the shaft S, while a pinion I is fast on the shaft T. Gear J is loose on the shaft U and adapted to be connected thereto by a clutch U', while a gear L is loose on the shaft W and adapted to be connected by a clutch W'. Gear J' is fast on the shaft U and gear L' fast on the shaft W.

The gear A meshes with the gear B; the gear D meshes with gear F and G'; gear F meshes with pinion I; gear M meshes with the gear A; pinion I meshes with the gear J'; gear J meshes with the gear E; gear G' meshes with the pinion K'; pinion K meshes with the gear L'; gear L meshes with the gear C and the gear G meshes with the gear E.

For the purpose of controlling the clutches, the ends of the shafts N, Q, R, U and W extend through the transmission housing 20 into cylinders 38 and movable within each of these cylinders is a hollow piston 39. The pistons 39 are provided with centrally located conical projections 40 which engage similarly shaped sockets 41 provided in the ends of the shafts just mentioned. The cylinders 38 are adapted to receive compressed air from the tank 21 through pipes 28, the passage of air through these pipes being selectively controlled by the selector or cylinder valve 26 in a manner to be hereinafter explained.

When the engine is idling, all of the clutches are disengaged and in order to connect the engine with the drive shaft to operate the automobile in low gear, the drive is through the gears D, F, M and A, air being admitted to the cylinder shaft Q so as to engage the clutch Q' to lock the gear F on its shaft. Reverse is through the gears B and A, air being admitted to the cylinder shaft N to engage the clutch P'. Second or intermediate speed is through the gears D, F, I, J', J and E, air being admitted to the cylinder shaft U to engage the clutch U'.

High speed is through the gears D, G', G and E, air being admitted to the cylinder of the shaft R to engage the clutch R'. Special speed is through the gears D, G', K', K, L', L and C, air being admitted to the cylinder shaft W to engage the clutch W'.

*Selector or cylinder valve.*

The selector or cylinder valve 26 comprises a substantially cup-shaped casing 43 having a cap or cover 44.

This casing has mounted therein a rotor 45 which is provided with a distributing passage 46. One end of this passage is in communication with the pipe 27 from the main valve 22, while its opposite end is adapted to be moved into register with any one of a number of spaced outlet ports 47. These ports are in communication with the pipes 28 and serve to selectively distribute the air to the desired cylinder of the transmission mechanism. The rotor 45 is further provided with an arcuate groove or passage 48 with which communicates a seat 49 provided in the casing 43, the groove or passage 48 being adapted to register with the ports 47 and being arranged so that all of the ports 47 may be in communication with the exhaust port 49 so as to completely exhaust the air from all of the cylinders 38, or the passage 46 may be brought into communication with any one of the ports 47, whereupon the remaining ports 47 will be in communication with the exhaust port 49 through the passage 48. By this means air will be exhausted from all of the cylinders 38 except the cylinder of the selected speed. The rotor 45 has extending therefrom an arm 50 which operates through an arcuate slot 51 provided in the cap 44. This arm 50 is connected with a suitable controlling device to be later described.

*Brake mechanism.*

Mounted upon the drive shaft O is a brake drum 52 which is adapted to be engaged by a brake band 53 which has secured thereto a pivotally mounted arm 54. This arm is actuated by a rod 55 which is connected to a piston (not shown) the latter operating within a cylinder 56 to which air is supplied through a pipe 57 from the valve 22.

The valve 22 comprises a substantially cup-shaped housing 58 which is closed by a cap or cover 59. Operating within the housing 58 is a rotor 60 whose periphery is provided with oppositely located grooves 61 and 62. The housing 58 is provided with ports 63, 64 and 65. The port 63 provides communication with the pipe 23 from the tank 21, the port 65 provides communication through the pipe 57 with the brake cylinder 56, while the port 64 provides communication through the pipe 27 with the selector or cylinder valve 26. The housing 58 is further provided with exhaust ports 66 and 67.

When the rotor 60 is in the position shown in Figure 13 of the drawings, air from the tank 21 will enter the valve 22 through the port 63 and travel through the passage 62, the port 64 and the pipe 27 to the selector or cylinder valve 26 from where it may be distributed to the proper cylinder 38 for the speed selected. Air from the brake cylinder will exhaust through the passage 61 and the port 67 to the atmosphere.

When the rotor 60 is moved in the direction of the arrow shown in Figure 13, the exhaust port 67 will be closed and air will pass through the valve 22, entering the valve through the port 63 and travelling through the passage 61 outward through the port 65 to the brake cylinder so as to operate the brake. Air from the selector or cylinder valve 26 will exhaust through the port 64, the passage 62 and outward through the exhaust port 66.

*Controlling device.*

The arm 50 of the valve 26 has pivotally connected thereto one end of a horizontally disposed rod 68. The opposite end of this rod is pivotally connected to an arm 69. This arm extends from and is rigid with a tubular member or sleeve 70 which rotates upon the steering column 71 of the automobile. The tubular member or sleeve 70 extends substantially throughout the length of the steering column 71 and the arm 69 extends from the lower end of the sleeve. The upper end of the sleeve carries a collar 72 and pivotally mounted between spaced ears carried by this collar is a lever 73. The lever 73 extends through and is guided by a slotted segment 74 which is supported upon the outer ends of arms 75. The inner ends of these arms are pivoted upon pins or trunnions 76 which are secured to and extend from the steering column 71. The sleeve 70 is provided with oppositely located circumferentially arranged slots 77 for the accommodation of the pins 76.

By moving the lever 73 horizontally along the slotted segment 74, the sleeve 70 may be rotated about the steering column. This will move the arm 69 and the arm 50 through the connection of the rod 68 so that the rotor 45 of the valve 26 may be positioned for the supply of air to any one of the cylinders 38 of the transmission mechanism, as has been previously described. Suitable indicating means may be provided upon the slotted segment 74 for the proper positioning of the lever 73.

As the segment 74 and the lever 73 are pivotally supported, the said lever may be moved vertically, the connection between the lever and segment causing a like movement of the latter. Pivotally secured to one of the arms 75 is one end of a rod 78. The opposite end of this rod is pivotally secured to an arm 79, which extends from the rotor 60 of the valve 22. This provides means whereby the valve 22 may be operated to supply air to the brake cylinder irrespective of the horizontal position of the lever 73, so that the brake may be applied when any of the speed changes of the transmission mechanism are effected.

The invention is susceptible of various changes in its form, proportions and minor details of construction and the right is herein reserved to make such changes as properly fall within the scope of the appended claims.

Having described the invention what is claimed is:—

1. An automobile transmission mechanism comprising a sectional drive shaft including a longitudinally movable section, a driven shaft and intermediate shafts, gearing of different ratios connecting the shafts, a clutch for connecting the sections of the drive shaft, clutches for controlling the operation of the intermediate shafts, individual pistons engaging the shafts for moving the latter to engage the clutches and means whereby the pistons may be selectively operated.

2. An automobile transmission mechanism comprising a sectional drive shaft including a longitudinally movable section, a driven shaft and intermediate shafts, gearing of different ratios connecting the shafts, a clutch for connecting the sections of the drive shaft, clutches for controlling the operation of the intermediate shafts and pneumatically operated selective means individual to each shaft whereby the movable section of the drive shaft and the intermediate shafts may be moved longitudinally to control the clutches and regulate the speed and direction of rotation of the driven shaft.

3. An automobile transmission mechanism comprising a sectional drive shaft including a longitudinally movable section, a driven shaft and intermediate shafts, gearing of different ratios connecting the shafts, a clutch for connecting the sections of the drive shaft, clutches for controlling the operation of the intermediate shafts, cylinders receiving the ends of the drive and intermediate shafts, pistons operating within the cylinders and engaging the shafts and selectively controlled means for supplying fluid under pressure to the cylinders to control the clutches and regulate the speed and direction of rotation of the driven shaft.

4. An automobile transmission mechanism comprising a sectional drive shaft including a longitudinally movable section, a driven shaft and intermediate shafts, gearing of different ratios connecting the shafts, a clutch for connecting the sections of the drive shaft, clutches for controlling the operation of the intermediate shaft, individual fluid operated means for engaging each of the shafts for moving the latter to engage the clutches and means for selectively controlling the fluid operated means.

5. In a transmission mechanism, a drive shaft, a gear mounted thereon, a driven shaft, a gear mounted upon the driven shaft, a plurality of slidable intermediate shafts, a set of gears of individual ratio for each intermediate shaft, the gears of the intermediate shafts engaging the gears of the drive and driven shafts, a clutch mounted upon each intermediate shaft, one member of each clutch being engaged with a gear in mesh with the gear of the drive shaft, while the other member of the clutch is free to rotate on its shaft, cylinders receiving one of the ends of each intermediate shaft, a piston within each cylinder and engaging the ends of the shafts and selective means whereby fluid under pressure may be supplied to the cylinders for the operation of the pistons.

In testimony whereof I affix my signature.

JOHN A. TOOMEY.